United States Patent [19]
Van Den Goor

[11] Patent Number: 5,657,858
[45] Date of Patent: *Aug. 19, 1997

[54] CONVEYOR

[75] Inventor: Jakobus Marie Van Den Goor, Eindhoven, Netherlands

[73] Assignee: Vanderlande Industries Nederland B.V., Veghel, Netherlands

[*] Notice: The term of this patent shall not extend beyond the expiration date of Pat. No. 5,435,429.

[21] Appl. No.: 608,309

[22] Filed: Feb. 28, 1996

Related U.S. Application Data

[63] Continuation of Ser. No. 250,603, May 27, 1994, abandoned.

[30] Foreign Application Priority Data

May 27, 1993 [NL] Netherlands .................... 9300909

[51] Int. Cl.⁶ .................................................. B65G 47/46
[52] U.S. Cl. .................................................. 198/890
[58] Field of Search ............... 198/370.04, 370.06, 198/890, 890.1

[56] References Cited

U.S. PATENT DOCUMENTS

| | | | |
|---|---|---|---|
| 3,231,068 | 1/1966 | Harrison et al. ................. | 198/370.06 |
| 3,550,748 | 12/1970 | Hauer ................................ | 198/370.06 |
| 4,031,998 | 6/1977 | Suzuki et al. ..................... | 198/370.04 |
| 4,096,936 | 6/1978 | Nielsen ............................. | 199/370.06 |
| 4,930,613 | 6/1990 | Okura et al. ...................... | 198/370.06 |
| 5,435,429 | 7/1995 | Van Den Goor ................... | 198/890.1 |

*Primary Examiner*—Joseph E. Valenza
*Attorney, Agent, or Firm*—Oblon, Spivak, McClelland, Maier & Neustadt, P.C.

[57] ABSTRACT

A conveyor includes a frame and at least one moving mechanism which can be moved in a longitudinal direction thereof by a driving mechanism. Carriers extending transversely to the direction of movement of the moving mechanism are coupled to the moving mechanism. At least a few of the carriers support sliding pieces, which can be moved along the respective carriers by guide mechanisms, so as to move objects to be conveyed by the conveyor during operation. A carrier is coupled to the moving mechanism near its center, which moving mechanism includes links, which are pivotable with respect to each other about pivot pins crossing or intersecting each other at least substantially perpendicularly.

8 Claims, 5 Drawing Sheets

5,657,858

CONVEYOR

This application is a continuation of application Ser. No. 08/250,603, filed on May 27, 1994, now abandoned.

BACKGROUND OF THE INVENTION

1. Field of the Invention

The invention relates to a conveyor provided with a frame and with at least one moving means which can be moved in its longitudinal direction by driving means, to which carriers extending transversely to the direction of movement of the moving means are coupled, while at least a few of said carriers support sliding pieces, which can be moved along the respective carriers by guide means, so as to move objects to be conveyed by the conveyor during operation.

2. Discussion of the Background

Devices of this kind are for example known from U.S. Pat. No. 3,361,247 and French Patent No. 2,388,737.

The carriers of these known devices are secured at their ends to two endless moving means extending parallel to each other, whereby the active carriers constitute the upper part of an endless chain and the non-active carriers constitute a return part of an endless chain, which is located under said upper part. Consequently only some of the carriers can be used effectively for conveying the objects, while the other nonactive carriers move back under the active carriers towards the starting point of the conveyor.

SUMMARY OF THE INVENTION

According to the invention each of said carriers is coupled to a single moving means near its center, said moving means being built up of links, which are pivotable with respect to each other about pivot pins crossing or intersecting each other at least substantially perpendicularly.

By using the construction according to the invention, an effective conveyor is obtained, whereby all the carriers can be moved along the entire path of movement of the moving means with their active surface turned upwards, while it is also possible to move the carriers from a higher level to a lower level and vice versa, so that the number of applications of the device according to the invention has been considerably increased in comparison with the device according to the aforesaid patents. It its thereby possible to discharge objects from the conveyor in more places than with the aforesaid known conveyor while using the same number of carriers and the same length of the moving means.

It, is noted that a conveyor comprising a moving means built up of links, which are pivotable about horizontal and vertical pivot pins with respect to each other, is known per se, for example from Dutch Patent Application No. 8900974, but said Dutch Patent Application No. 8900974 relates to a type of conveyor different from the present invention.

BRIEF DESCRIPTION OF THE DRAWINGS

The invention will be explained in greater detail hereafter with reference to an embodiment of the construction according to the invention diagrammatically illustrated in the accompanying Figures.

DESCRIPTION OF THE PREFERRED EMBODIMENTS

Figure 1:
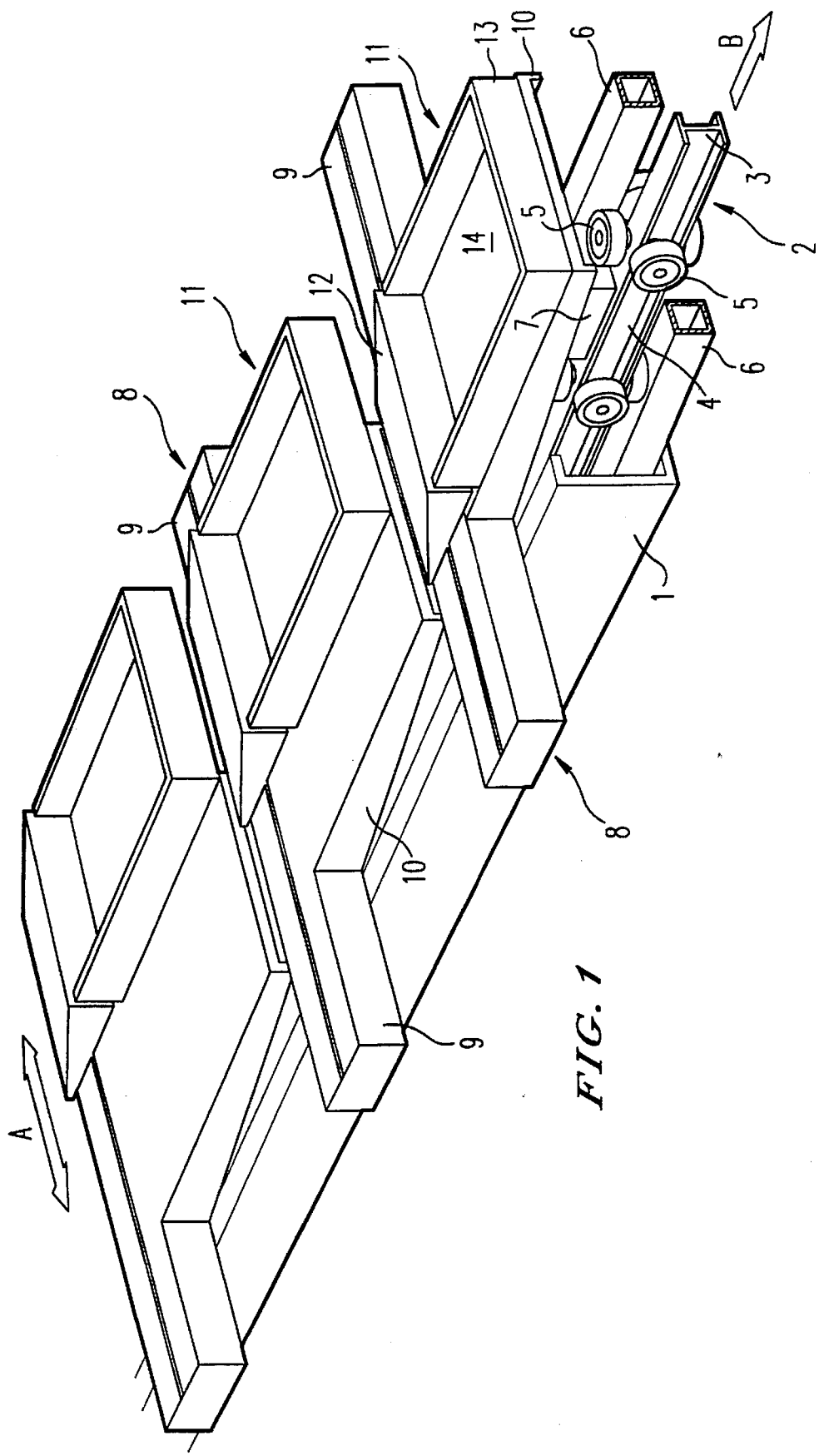
FIG. 1 is a diagrammatic, perspective view of a part of a conveyor according to the invention.

As is shown In FIG. 1 the conveyor comprises a frame 1, in which a moving means 2 in the shape of a conveyor chain is guided. The conveyor chain is provided with links 3 and 4 respectively, which are pivotable about horizontal and vertical pivot pins with respect to each other. Guide wheels 5, which are rotatable about horizontal and vertical axes, are connected to the conveyor chain 2 at a point near the pivot pins, said guide wheels cooperating with guide rails 6 accommodated within the frame 1 of the conveyor. The construction of such an endless moving means or conveyor chain is, for example, described in Dutch Patent Application No. 8900974.

Carriers 8 are secured to at least a number of the links 3 and/or 4 by means of upwardly extending supports or corrections 7. In the illustrated embodiment the carriers have a substantially T-shaped configuration, when seen in plan view, whereby they are made up of a beam 9 extending transversely to the longitudinal direction of the conveyor chain 2 and a platform 10 joining the center of the beam.

A sliding piece 11 is movable along the carrier 8, transversely to the longitudinal direction of the conveyor chain 2 (arrow A).

The sliding piece 11 comprises a coupling piece 12, by means of which the sliding piece is movably coupled to the beam 9, and furthermore a frame-like part 13, which bounds a receptacle 14 which is open at its upper side and its bottom side.

As will be apparent from FIG. 1, the size of the frame 13 bounding the receptacle 14 is adapted to the size of the platform 10, so that the receptacle 14 is closed by the platform 10 at its bottom side when the sliding piece 11 is positioned near the center of the beam 8.

Figure 2:
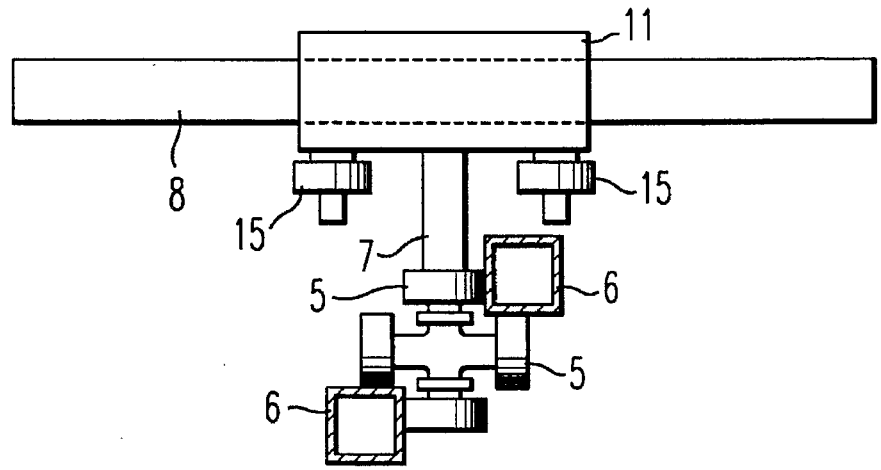
FIG. 2 is a diagrammatic view of a carrier and a sliding piece, which can be moved along said carrier.
Figure 3:
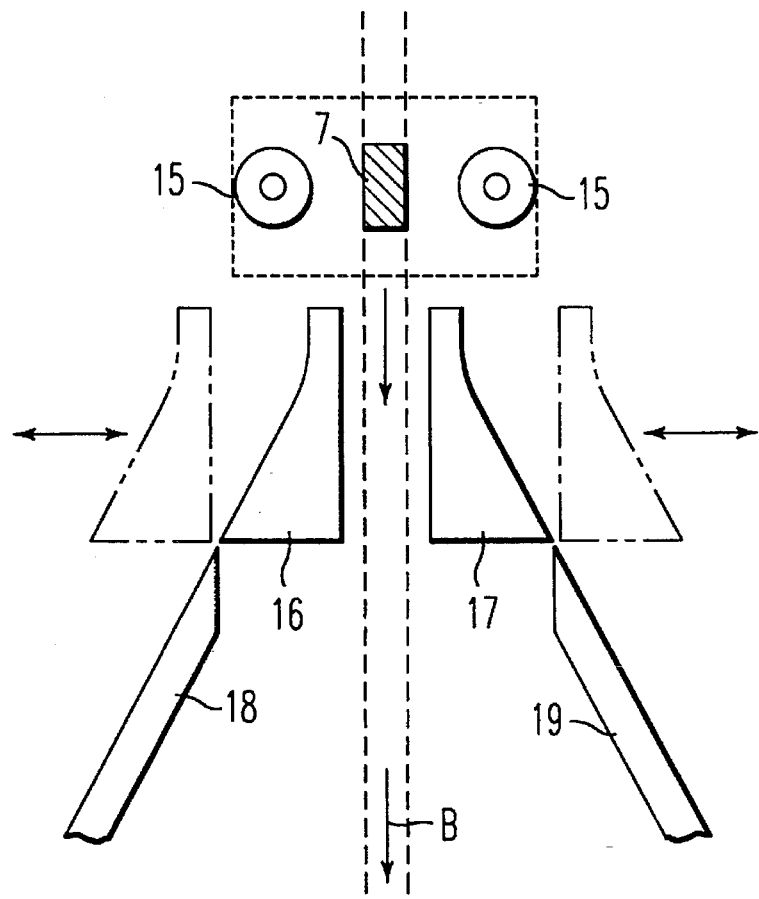
FIG. 3 is a diagrammatic plan view of a switch station, in which means are disposed for moving the sliding piece with respect to the carrier.

As is diagrammatically indicated in FIGS. 2 and 3, two guide wheels 15 are secured to the bottom side of the coupling piece 12 positioned under the beam 9, said guide wheels being freely rotatable about axes of rotation extending perpendicularly to the beam 9.

Two switch pieces 16 and 17 are disposed near a switch station, which is diagrammatically indicated in FIG. 3, said switch pieces each being adjustable, by setting means not shown, between the position illustrated in full lines in FIG. 3 and the position illustrated in dotted lines in FIG. 3. Guide rails 18 and 19 respectively, which extend obliquely to the direction of movement of the chain, are disposed downstream of said switch pieces, seen in the intended direction of movement of the conveyor chain 2 according to arrow B.

It will be apparent that when a carrier with a sliding piece connected thereto passes the switch station shown in FIG. 3 while the two switch pieces 16 and 17 are in the position illustrated in dotted lines in FIG. 3, the guide wheels 15 can pass the switch station without impediment and the sliding piece 11 will thus not be moved relative to the carrier 8.

When the switch piece 16 has for example been moved to the position illustrated in full lines, however, the left-hand (as seen in FIGS. 2 and 3) guide wheel 15 will come into contact with the left-hand (seen in FIG. 3) guide face of the switch piece 16 and start to move along said guider face and along the rail 18, which will cause the sliding piece 11 to move towards the left with respect to the carrier 8.

In a similar manner the sliding piece 11 will move towards the right along the carrier 8 when instead of the switch piece 16 the switch piece 17 is moved to the position shown in full lines in FIG. 3.

During operation of the above-described conveyor objects to be moved may be supplied in a certain supply station, along which the carriers and the sliding pieces connected thereto are passed, while the sliding pieces are positioned in such a manner that the frame-like parts 13 are located above the platforms 10. The supply of objects may, for example, take place via a chute or the like. One or more objects may thereby be placed in each receptacle 14 as desired.

The objects supplied may be delivered at a desired station by moving the sliding piece in the above-described manner with respect to the respective carrier, whereby the receptacle 14 will come to lie beside the platform 10, and an object present within the receptacle 14 can fall through the open bottom side of the receptacle, where said object may be caught by means of a chute or the like (not shown).

Then the shifted sliding pieces may be returned to their central position by guide means (not shown) which are known per se, before being passed along the supply station again so as to receive objects to be moved.

Of course variations and/or additions to the construction which is described above and which is illustrated in the Figures are conceivable.

When it is for example only necessary to discharge objects on one side of the conveyor, it will be possible to use L-shaped carriers instead of the T-shaped carriers that are shown in FIG. 1. Furthermore it is possible, of course, to adapt the shape of the receptacle to the shape of the objects to be moved, if desired.

Also with regard to the switch station variations to the above-described construction illustrated in FIGS. 2 and 3 are conceivable.

Figure 4:
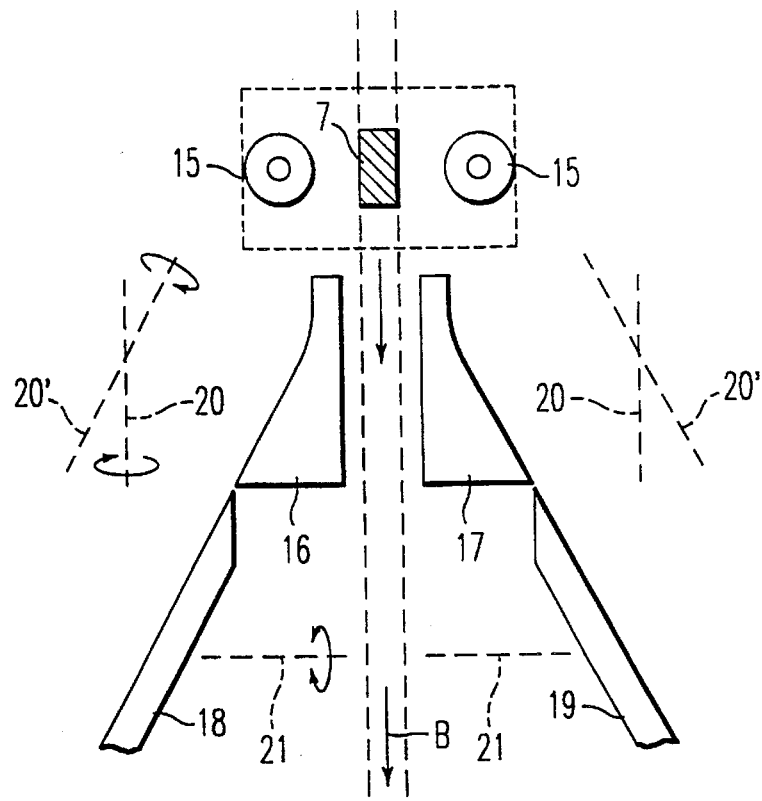
FIGS. 4–7 show further embodiments of switch stations.

Thus FIG. 4 shows a view of the switch station which corresponds with FIG. 3. As is diagrammatically indicated in said FIG. 4, each of the switch pieces 16 and 17 may be pivoted from a position, in which a respective switch tongue cooperates with a guide wheel 15 in the above-described manner, to a position in which the switch tongue in question is located near the path of movement of the guide wheel in question, for example about a pivot pin 20 extending parallel to the direction of movement of the carriers with the guide wheels 15, or for example about a pivot pin 20' extending parallel to the rail 18 or 19, or for example about a pivot pin 21 extending perpendicularly to the direction of movement of the carriers.

Instead of the horizontal sliding movement explained with reference to FIG. 3 or the pivoting movement explained with reference to FIG. 4, it is also possible for the switch pieces 16 and 17 to be shifted vertically in order to move the switch pieces 16 and 17 into or out of the path of the guide wheels 15.

Figure 5:
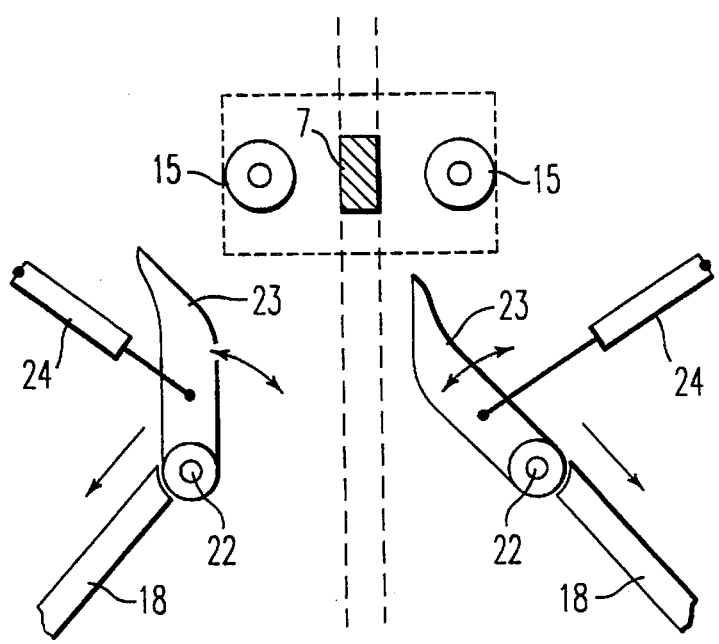

FIG. 5 shows a plan view corresponding with FIGS. 3 and 4 of a switch station, whereby switch pieces 23, which are pivotable about vertical pivot pins 22, are provided near the upstream ends of the rail 18 and 19. The switch pieces 23 are adjustable thereby, for example by means of setting cylinders 24 coupled to the switch pieces. It will be apparent from FIG. 5 that each switch piece 23 can be pivoted from a position in which a guide wheel 15 cooperating with the switch tongue in question can freely pass the switch station to a position in which a guide wheel 15 cooperating with the switch piece in question will be intercepted by the switch piece in order to be guided in the direction of the rail 18 or 19, so as to move the sliding piece 11 along the carrier 8 in the above-described manner.

Figure 6:
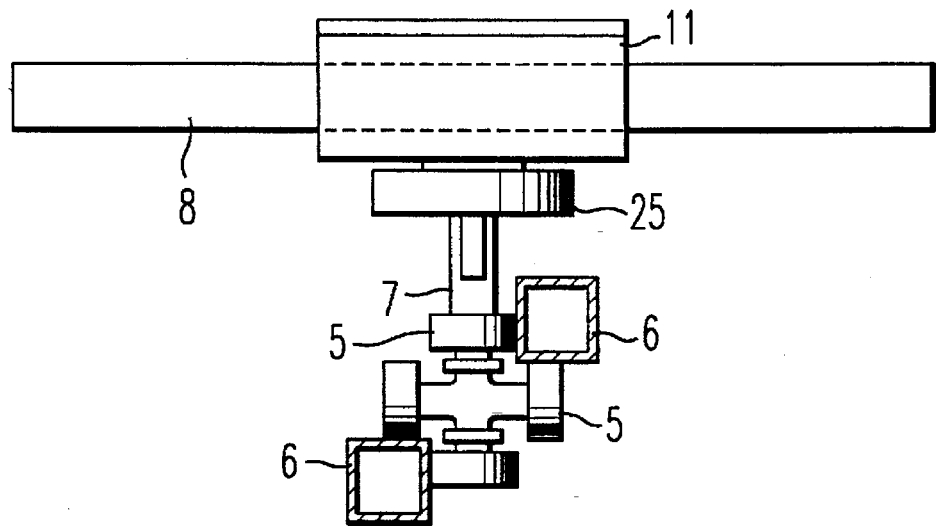
Figure 7:
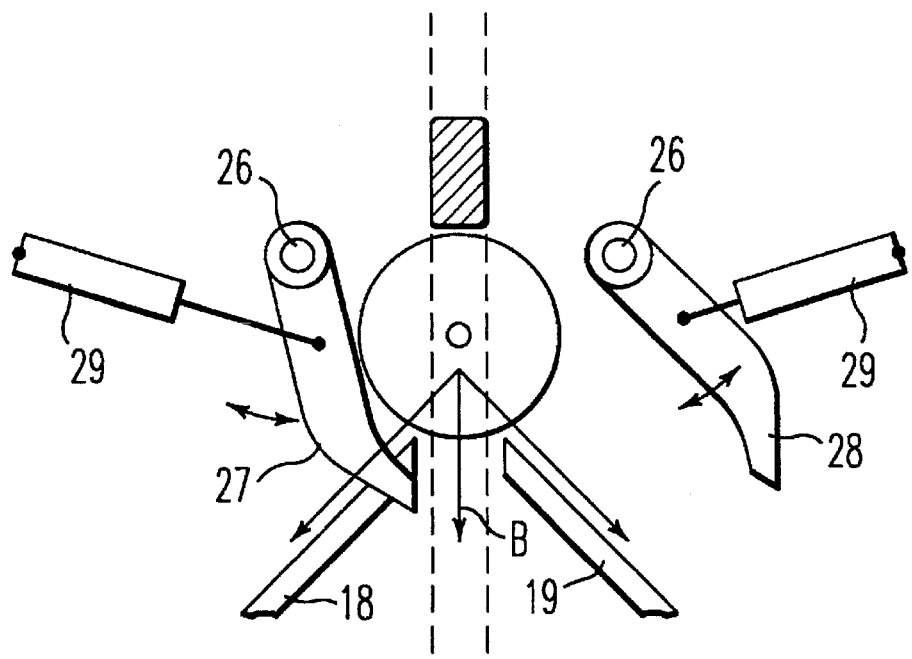

FIGS. 6 and 7 show views corresponding with the above-described FIGS. 2 and 3 of a further embodiment. As appears in particular from FIG. 6, in this embodiment the two guide wheels 15 have been replaced by a single guide wheel 25, which is designed such that the wheel 25 projects beyond the nearby support 7 on both sides, as seen in the direction of movement of the endless moving means with the carriers 8 coupled thereto.

As is shown in FIG. 7 two switch pieces 21 and 28, which are capable of pivoting movement about vertical pivot pins 26, may be provided for guiding the guide wheel in a switch station, whereby said switch pieces can be pivoted by means of setting cylinders 29. From FIG. 7 it will be apparent that when the switch piece 27 is pivoted into the path of the guide wheel 25, said guide wheel will be guided in the direction of the rail 19, whereas the guide wheel will be guided towards the rail 18 when the switch piece 28 is pivoted into the path of the guide wheel 25.

It will furthermore be apparent that also with the embodiment according to FIGS. 6 and 7 it will be possible to use switch pieces which may be moved into and out of the path of the guide wheel 25 in a different manner.

Furthermore it stands to reason that the invention is not limited to the use of carriers comprising sliding pieces provided with receptacles as shown in FIG. 2.

Figure 8:
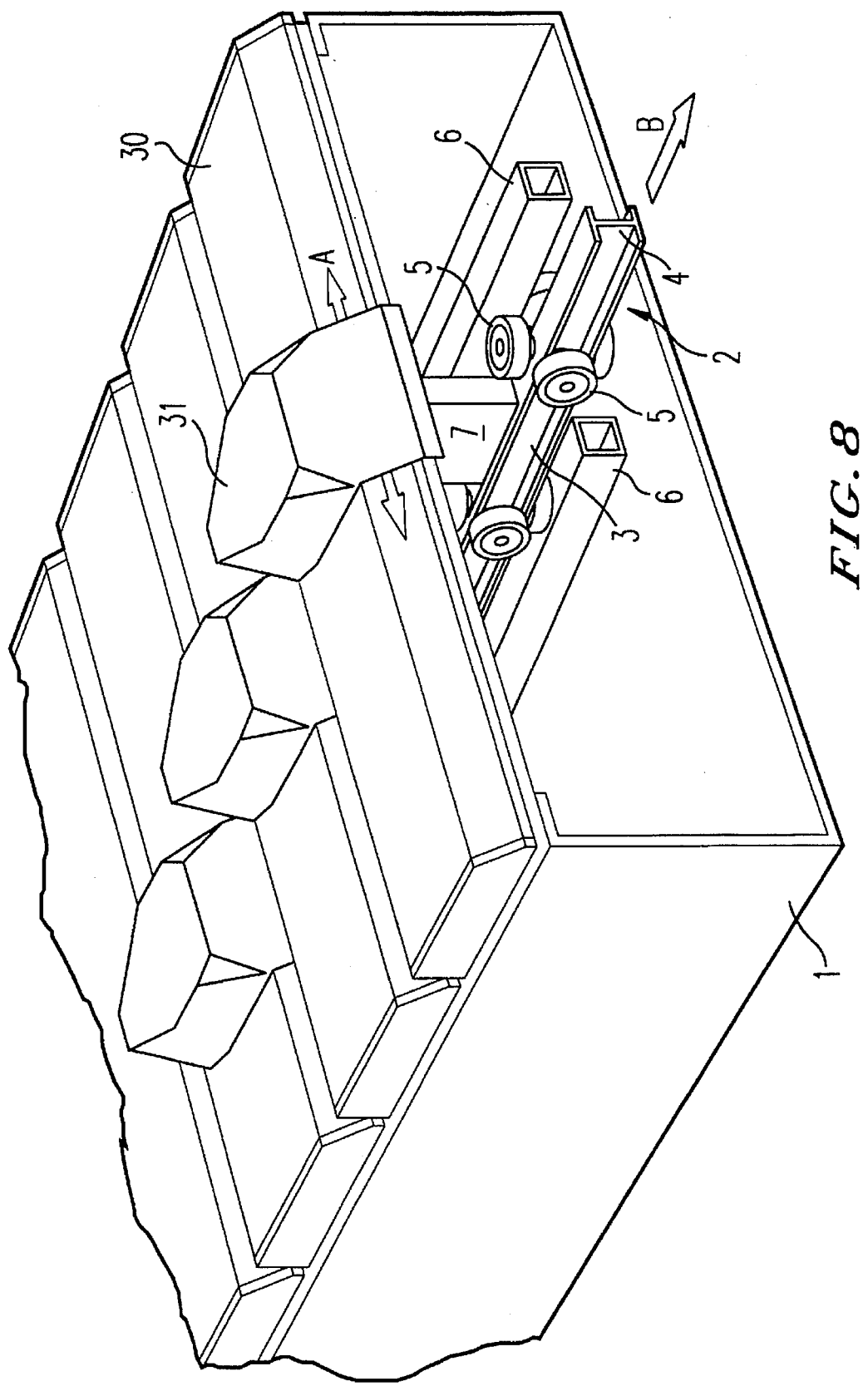
FIG. 8 is a diagrammatic perspective view of a part of a further conveyor according to the invention.

As is for example shown in FIG. 8, it is also possible for a number of at least substantially identical elongated beam-like carriers 30 to be coupled to the endless moving means 2, onto which the objects to be moved may be placed directly and whereby the objects in question may be moved off the beams 30 at desired stations by means of sliding pieces 31, which are movable along along the carriers 30, within the spirit of the embodiments as for example described and illustrated in the aforesaid U.S. Pat. No. 3,361,247 or the aforesaid French Patent No. 2,388,737.

In order to make it possible to pass through curves having a comparitively small radius, the distance between successive carriers 30 may for example be larger than shown in the diagrammatic Figure, and/or the carriers 30 maybe narrower at one end or both ends than in the center.

I claim:

1. A conveyor which comprises:
    a frame;
    a single moving means having a plurality of links which are pivotable with respect to each other about pivot axes crossing or intersecting each other at least substantially perpendicularly;
    driving means for driving the moving means in a longitudinal direction;
    a plurality of carriers which have beams extending transversely to the direction of movement of the moving means;
    a plurality of supports extending upwardly from said moving means, wherein the supports are respectively coupled to the beams in proximity with a center portion of the beams and are connected to said links of the moving means;
    a plurality of sliding pieces respectively supported by the beams so as to be slidably movable to and from along the beams and displacing objects to be conveyed by the conveyor during a conveying operation;

guide wheels respectively directly mounted on the sliding pieces;

guide rails which extend transversely to a direction of movement of the moving means; and switch pieces arranged in a switch station such that the guide wheels are guided in a direction of said guide rails by engagement of said guide wheels with said switch pieces wherein said switch pieces are pivotable into and out of a path of movement of the guide wheels.

2. A conveyor which comprises:

a frame;

a single moving means having a plurality of links which are pivotable with respect to each other about one of pivot axes crossing and pivot axes intersecting each other at least substantially perpendicularly;

driving means for driving the moving means in a longitudinal direction;

a plurality of carriers which have beams extending transversely to the direction of movement of the moving means;

a plurality of supports extending upwardly from said moving means, wherein the supports are respectively coupled to the beams in proximity with a horizontal center portion of the beams and are connected to said links of the driving means;

a plurality of sliding pieces respectively supported by the beams so as to be slidably movable to and fro along the beams and displacing objects to be conveyed by the conveyor during a conveying operation;

guide wheels respectively directly mounted on the sliding pieces;

guide rails which extend transversely to a direction of movement of the moving means, and switch pieces arranged in a switch station such that the guide wheels are guided in a direction of said guide rails by engagement of said guide wheels with said switch pieces.

3. A conveyor according to claim 2, wherein said carrier is wider in proximity with a horizontal center portion thereof than in proximity with at least one end thereof as seen in a longitudinal direction of said moving means.

4. A conveyor according to claim 2 wherein said guide wheels are respectively coupled to said sliding pieces and said guide wheels project beyond a coupling piece on both sides of the coupling piece, as seen in the direction of movement of the moving means.

5. A conveyor which comprises:

a frame;

a single moving mechanism having a plurality of links which are pivotable with respect to each other about one of pivot axes crossing and pivot axes intersecting each other at least substantially perpendicularly;

a driving mechanism driving the moving mechanism in a longitudinal direction;

a plurality of carriers which have beams extending transversely to the direction of movement of the moving mechanism;

a plurality of supports extending upwardly from said moving mechanism, wherein the supports are respectively coupled to the beams in proximity with a horizontal center portion of the beams and are connected to said links of the driving mechanism;

a plurality of sliding pieces respectively supported by the beams so as to be slidably movable to and fro along the beams and displacing objects to be conveyed by the conveyor during a conveying operation;

guide wheels respectively directly mounted on the sliding pieces;

guide rails which extend transversely to a direction of movement of the moving mechanism; and switch pieces arranged in a switch station such that the guide wheels are guided in a direction of said guide rails by engagement of said guide wheels with said switch pieces.

6. A conveyor according to claim 5, wherein said carrier is wider in proximity with a horizontal center portion thereof than in proximity with at least one end as seen in a longitudinal direction of said moving mechanism.

7. A conveyor which comprises:

a frame;

a single moving mechanism having a plurality of links which are pivotable with respect to each other about pivot axes crossing or intersecting each other at least substantially perpendicularly;

a driving mechanism driving the moving mechanism in a longitudinal direction;

a plurality of carriers which have beams extending transversely to the direction of movement of the moving mechanism;

a plurality of supports extending upwardly from said moving mechanism, wherein the supports are respectively coupled to the beams in proximity with a center portion of the beams and are connected to said links of the moving mechanism;

a plurality of sliding pieces respectively supported by the beams so as to be slidably movable to and from along the beams and displacing objects to be conveyed by the conveyor during a conveying operation;

guide wheels respectively directly mounted on the sliding pieces;

guide rails which extend transversely to a direction of movement of the moving mechanism; and switch pieces arranged in a switch station such that the guide wheels are guided in a direction of said guide rails by engagement of said guide wheels with said switch pieces wherein said switch pieces are respectively pivotable into and out of a path of movement of the guide wheels.

8. A conveyor according to claim 5, wherein said guide wheels are respectively coupled to said sliding pieces and said guide wheels project beyond the connecting piece on both sides of the connecting piece, as seen in the direction of movement of the moving mechanism.

* * * * *